US008569909B2

(12) United States Patent
Thorburn et al.

(10) Patent No.: US 8,569,909 B2
(45) Date of Patent: Oct. 29, 2013

(54) METHOD AND ARRANGEMENT TO CONTROL AN AC SYSTEM

(75) Inventors: Stefan Thorburn, Vasteras (SE); Lars Liljestrand, Vasteras (SE); Ake Petersson, Vasteras (SE)

(73) Assignee: ABB Research Ltd. (CH)

( * ) Notice: Subject to any disclaimer, the term of this patent is extended or adjusted under 35 U.S.C. 154(b) by 117 days.

(21) Appl. No.: 13/340,837

(22) Filed: Dec. 30, 2011

(65) Prior Publication Data
US 2012/0112559 A1 May 10, 2012

Related U.S. Application Data

(63) Continuation of application No. PCT/EP2009/058341, filed on Jul. 2, 2009.

(51) Int. Cl.
*H02J 3/26* (2006.01)

(52) U.S. Cl.
USPC .......................................................... 307/14

(58) Field of Classification Search
USPC .......................................................... 307/14
See application file for complete search history.

(56) References Cited

FOREIGN PATENT DOCUMENTS

DE 2228042 A1 1/1974

OTHER PUBLICATIONS

C.W. Taylor and A.L. Van Leuven; "CAPS: Improving power system stability using the time-overvoltage capability of large shunt capacitor banks", IEEE Transactions on Power Delivery, vol. 11, No. 2, Apr. 1996; pp. 783-792.
H.K. Tyll; "FACTS Technology for Reactive Power Compensation and System Control"; paper for IEEE/PES panel session on FACTS, Nov. 8-11, 2004; pp. 976-980.
International Search Report and Written Opinion of the International Searching Authority; Application No. PCT/EP2009/058341; Issued: Apr. 14, 2010; Mailing Date: Apr. 26, 2010; 10 pages.

*Primary Examiner* — Rexford Barnie
*Assistant Examiner* — Dru Parries
(74) *Attorney, Agent, or Firm* — St. Onge Steward Johnston & Reens LLC

(57) ABSTRACT

An arrangement to control an electrical property of a medium or high voltage AC system including a number n of phases with n being at least two includes a number n of phases, each phase including a series connection of at least two electrical elements with an intermediate connection point between each pair of the at least two electrical elements, where each of the n phases of the arrangement is connected on one side to an original common neutral point and on the other side to one of the n phases of the AC system. The arrangement further includes a number of first switchable interconnections, where the first switchable interconnections are each arranged between two intermediate connection points of two of the n phases of the arrangement, and at least one control unit arranged to control the first switchable interconnections.

14 Claims, 6 Drawing Sheets

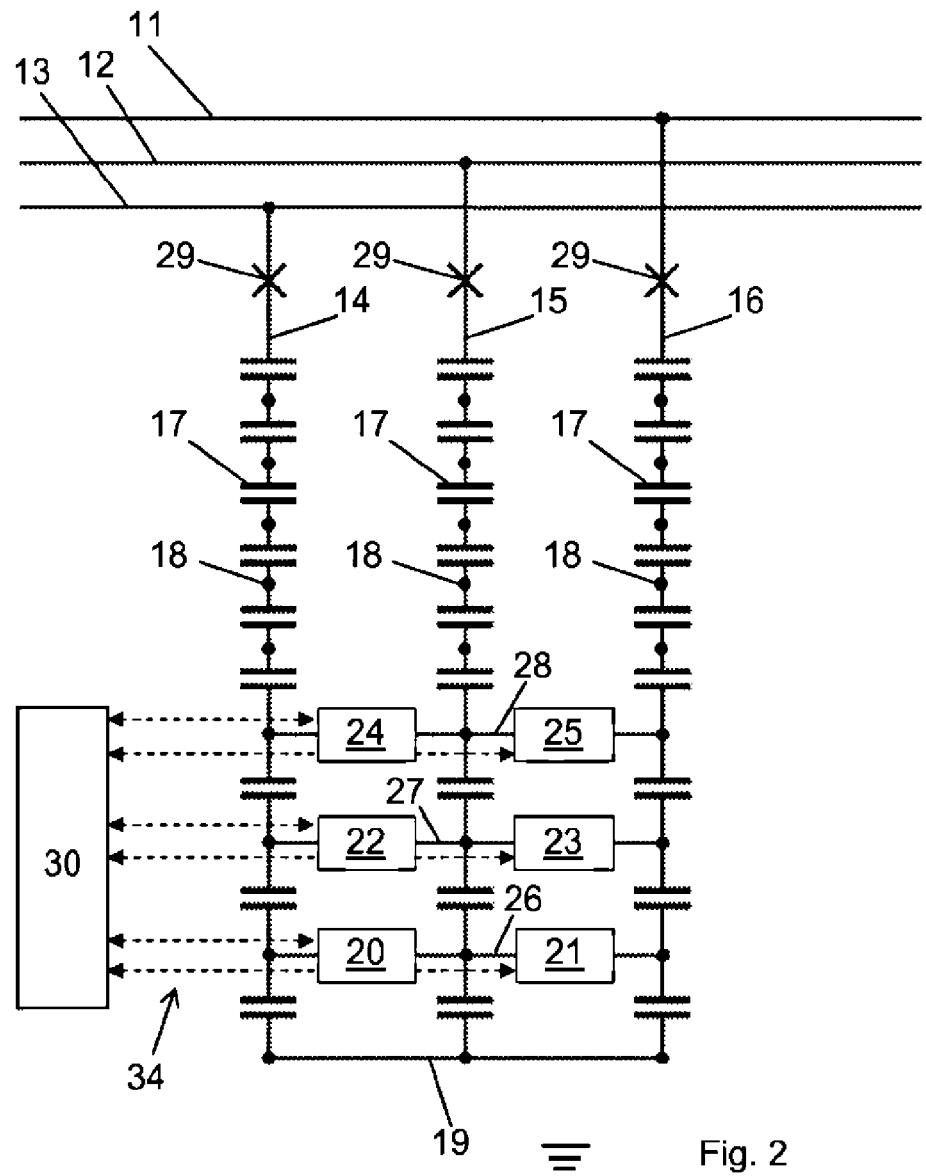
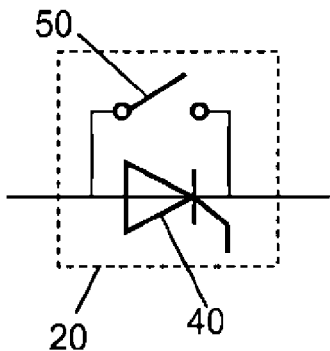
Fig. 2
Fig. 5

METHOD AND ARRANGEMENT TO CONTROL AN AC SYSTEM

CROSS-REFERENCE TO RELATED APPLICATIONS

The present application is a continuation of pending International patent application PCT/EP2009/058341 filed on Jul. 2, 2009 which designates the United States and the content of which is incorporated herein by reference.

FIELD OF THE INVENTION

The invention relates to a method and to an arrangement to control an electrical property of a medium voltage or high voltage AC system comprising a number n of phases with n being at least two. The arrangement comprises a number n of phases, each phase comprising a series connection of at least two electrical elements with an intermediate connection point between each pair of the at least two electrical elements, where each of the n phases of the arrangement is connected on one side to an original common neutral point and on the other side to one of the n phases of the AC system.

BACKGROUND OF THE INVENTION

The invention originates from the field of reactive power compensation and voltage control in an AC power transmission or distribution system, in particular from the field of shunt compensation, where the following is known in the art. In "FACTS Technology for Reactive Power Compensation and System Control" by H. K. Tyll, paper for IEEE/PES panel session on FACTS, Nov. 8-11, 2004, Sao Paulo, different types of solutions for shunt compensations are shown. On the one hand there are mechanically-switched capacitors (MSC) and mechanically switched reactors (MSR), which are cost-effective solutions providing steady-state voltage support and being characterized by a slow response time and a discontinuous control working at a reduced precision level. As a disadvantage, high transient currents and voltages may occur during switching operations. On the other hand there are solutions which are based on power electronic switching, such as shunt-connected static var compensators (SVC) and static synchronous compensators (STATCOM), which provide dynamic voltage support and are characterized by a fast response time and a control which is performed continuously and at a higher precision level. Here the main disadvantage is the occurrence of commutation losses.

With regards to MSCs, the following is further known from "CAPS: Improving power system stability using the time-overvoltage capability of large shunt capacitor banks", by C. W. Taylor and A. L. Van Leuven, IEEE Transactions on Power Delivery, Vol. 11, No. 2, April 1996. In the article, an arrangement for reactive shunt compensation, called CAPS, is described where during low voltage emergencies several series groups of wye-connected capacitor banks are shorted to increase reactive power output. The CAPS equipment includes as main components a vacuum breaker and a current limiting reactor which together perform the switching action as well as a magnetic potential transformer in order to discharge trapped charges. The CAPS (capacitor bank series group shorting) arrangement was used to create one single high voltage step in emergency situations, namely when the voltage dropped below a threshold for twelve seconds. In this case, the several groups of capacitor banks were short-circuited and thereby the reactive power output was increased by 27%. Due to the use of a mechanical switch, the response time of the arrangement was considerably low. For example, in the article it is given a time constant of 140 ms for opening the vacuum breaker.

It has been recognized by the inventors that in practice a continuous reactive power compensation and control as provided by SVCs and STATCOMs is required only for a limited number of medium voltage or high voltage AC systems, so that it is often not economically justified to install these high level systems in all places where such compensation and control might be needed only occasionally. The employment of MSCs, however, does not always offer the flexibility required, due to their large step response time as well as to unavoidable transients.

SUMMARY OF THE INVENTION

It is therefore an object of the present invention to find an alternative solution for an arrangement to be used in reactive power compensation and control of medium voltage or high voltage AC systems of the kind described in the introduction.

This object is achieved by a method and an arrangement to control an electrical property of a medium voltage or high voltage AC system.

A method is provided to control an electrical property of a medium voltage or high voltage AC system via an arrangement, where the AC system and the arrangement each comprise a number n of phases with n being at least two, and where each of the n phases of the arrangement comprises a series connection of at least two electrical elements with an intermediate connection point between each pair of the at least two electrical elements, and where each of the n phases of the arrangement is connected on one side to a so called original common neutral point and on the other side to one of the n phases of the AC system.

The AC system is a medium or high voltage AC system with an operating voltage level between 1 kV and 50 kV or above 50 kV, respectively, and it may for example be an AC power transmission or distribution network, a wind farm or any other power generation utility, a transformer, a medium or high voltage AC load, such as a motor or a generator, etc. The electrical property of the AC system which is controlled can for example be an active or reactive power, a magnetic flux, a voltage or a current of the AC system. The at least two electrical elements which are series connected in each phase of the arrangement can be any type of impedance comprising resistors, capacitors and inductors. The original common neutral point may be connected to ground or may be free-floating.

According to the invention, the above described arrangement comprises a number of [n−1] first switchable interconnections, where the first switchable interconnections are each arranged between two intermediate connection points of two of the n phases of the arrangement, and at least one control unit arranged to control the first switchable interconnections according to the following method: the number of [n−1] first switchable interconnections are closed, thereby interconnecting all n phases and thereby creating a new common neutral point consisting of the closed first switchable interconnections. As a result, one or several electrical properties of the AC system are changed due to the one-step change of the overall impedance of the arrangement, where the kind of electrical property and the amount of its change depend on the type of the electrical elements.

In the known CAPS arrangement, several series-connected electrical elements are short-circuited in one phase, where these short-circuited electrical elements may be located anywhere within the series-connection of all electrical elements of that phase. For a multi-phase AC system and arrangement, as is regarded here, this means that for each phase, a separate short-circuiting equipment is required. Opposed to that, the main idea of the invention is to short-circuit the multiple phases of the arrangement with each other. Thereby, the original common neutral point is moved upwards, towards the AC system, and the electrical elements which are neutralized are those which are located between the original common neutral point and the new common neutral point. Due to this design, the number of required short-circuiting switches is reduced by one, where less switching parts is always of an advantage with respect to reliability, cost, control and maintenance efforts. A further advantage is the fact that the voltage levels to be switched are much lower than the voltage levels in the AC system, so that in an arrangement for a high voltage AC system only medium voltage equipment needs to be provided for the switchable interconnections. Compared to SVCs and STATCOMs the invention has the advantage that the solution is much cheaper since less components, in particular switching components, are required.

According to a preferred embodiment of the arrangement, the arrangement comprises a number m of further groups of [n−1] switchable interconnections, with m≥1, where each group m of [n−1] switchable interconnections is arranged to interconnect all n phases and is connected to intermediate connection points which differ from the intermediate connection points connected to one of the first switchable interconnections or other groups of switchable interconnections, and the at least one control unit is arranged to control the first and the further groups of switchable interconnections according to the embodiments of the method described below.

According to a preferred embodiment of the method, the new common neutral point is moved in a stepwise manner from the original common neutral point towards the AC system by closing the m further groups of [n−1] switchable interconnections one by one. By introducing more interconnections between the multiple phases of the arrangement and by closing them after each other so that the new common neutral point is moved further upwards, a change of the electrical property of the AC system in several smaller steps becomes possible. Accordingly, in case that the electrical elements comprise capacitors and/or reactors, reactive power compensation and control can be performed with an arrangement according to this preferred embodiment which is less costly, has a simpler layout and a smaller footprint than SVCs and STATCOMs. Compared to MSCs and MSRs as well as to the CAPS arrangement, the proposed solution provides the ability to not only act in a steady-state manner but in a quasi-continuous, step-wise manner and to cover a wider control range with regards to the smallest as well as the largest possible change of the electrical property of the AC system.

According to a further development of the preferred embodiment, the new common neutral point is moved in a stepwise manner from the AC system towards the original common neutral point by opening the m groups of switchable interconnections one by one followed by opening the first switchable interconnections. In this way, changes in the electrical property of the AC system can be reversed again, either completely or partly, so that the electrical property of the AC system can repeatedly assume any possible state within the whole possible control range.

In a special embodiment, the switchable interconnections are opened or closed, respectively, one after the other in a sequence which follows the positive sequence of an AC current on the AC system with a predetermined time difference in between. In case of a three-phase AC system with 50 Hz fundamental frequency, the time would advantageously be set to be equal to 90 degrees, i.e. a quarter of the time period of 20 ms, which is 5 ms.

In a further embodiment, the switchable interconnections each comprise at least one switching device, which is a power electronic switch and/or a mechanical switch, where the switching device is switched on and/or off so that no transient currents or transient voltages occur in the arrangement. Transient currents occur as reactions to the switching, i.e. to the sudden interruption of an earlier existing current flow or a sudden closure of an earlier non-existing current path. These transient currents can be avoided by taking the type of the impedance of the switchable interconnections and of the electrical elements into account. For example, if the overall behavior is capacitive, the switching off is preferably to be performed at a zero-crossing of the AC current through the respective switchable interconnection, and if the overall behavior is inductive, a zero-crossing of the respective AC voltage is the preferred point in time for a switching operation.

According to an even further embodiment, an unbalance in the current or voltage between at least two of the n phases of the arrangement is compensated for by operating an auxiliary switching device which is connected between the at least two of the n phases. In the corresponding arrangement, at least one auxiliary switching device, such as a thyristor, a diode or a mechanical transformer, is connected between the two of the intermediate connection points. By closing and opening the auxiliary switching device in an appropriate way and if necessary several couple of times unbalanced voltages or currents may be leveled out by allowing additional circulating currents to flow between the phases. Once the unbalance has disappeared, the auxiliary switching device is finally opened again.

In an embodiment of the arrangement, each switchable interconnection comprises at least one switching device, the at least one switching device being a power electronic switch and/or a mechanical switch, where the power electronic switch can be any switch with or without turn-off capability, such as a thyristor, an insulated-gate bipolar transistor (IGBT) or a metal-oxide-semiconductor field-effect transistor (MOSFET), and where the mechanical switch is any switching device with physical, preferably metallic, contacts to be interconnected by a movable conductive element. These types of switches have advantages compared with a vacuum breaker as known from the CAPS arrangement, since they allow for fast, dynamic control actions, and not only steady-state control, due to their higher operational frequency. In addition, they allow for transient free switching. Opposed to that, a common breaker can be operated with a much lower operational frequency due to the necessary re-energization of its spring elements. Further, likelihood for re-strikes and/or pre-strikes is present in most mechanic breaker configurations.

In a special development of the embodiment, a mechanical switch is connected in parallel with a power electronic element, the power electronic element being either a power electronic switch of the type described before or a diode. By using both types of switches, mechanical and power electronic, their disadvantages can be compensated by at the same time using their advantages. A power electronic switch alone has the advantage of reacting fast so that a precise switching with short switching times and high switching frequencies becomes possible. By choosing the points in time for switching appropriately, transient voltages and/or currents can be avoided. Disadvantages of a power electronic switch are the considerable losses which have to be taken into account should the switch be closed for a longer period of time. A mechanical switch on the other hand reacts slower so that the point in time when the actual switching should occur cannot be met with the same precision as with the power electronic switch which results in transient voltages and/or current. The advantage of a mechanical switch is the fact that only small losses occur in its closed state. Accordingly, transient voltages and/or currents can be avoided if the power electronic switch is opened first at a desired point in time, where this point in time can be much more accurately met than with the mechanical switch, and to afterwards open or close the mechanical switch in order to achieve the desired state-state switching state of the switchable interconnection. A diode is used as a cost-effective alternative power electronic element which gives a transient free response, too, even though it does not provide for the same high switching freedom as a power electronic switch.

In a further development of this embodiment, an auxiliary switching device, as is already described above, is connected in parallel with the parallel connected power electronic switch and mechanical switch in order to be able to level out any unbalances occurring between the n phases of the arrangement and in order to be able to remove trapped charges left in the short-circuited electrical elements after imperfect operation of the switchable interconnections.

In a further embodiment, the switchable interconnections are floating towards ground. This is advantageous in case that the original common neutral point is also floating towards ground in order to avoid any single line to ground fault current paths through the arrangement.

According to an even further embodiment, the arrangement comprises means for transferring control signals and/or operational power to the switchable interconnections. Operational power as well as control signals may for example be transferred electrically, including filters to ensure the required operating frequency or signal quality, or optically, such as via laser-diodes and optical fibres.

In a special arrangement, at least one auxiliary transformer is connected with its primary side in parallel with an electrical element of a first of the n phases and with its secondary side in parallel with an electrical element of a second of the n phases. This at least one auxiliary transformer is used to remove remaining trapped charges from the electrical elements which may be left in the electrical elements due to imperfect operation of the switchable interconnections. Preferably, the at least one auxiliary transformer is connected with one respective terminal on the primary and on the secondary side to the original common neutral point.

BRIEF DESCRIPTION OF THE DRAWINGS

The features and advantages of the present invention will become more apparent to a person skilled in the art from the following detailed description in conjunction with the appended drawings in which:

FIG. 2 shows an arrangement according to an embodiment of the invention;

FIG. 5 shows a third embodiment of a switchable interconnection;

DETAILED DESCRIPTION OF THE INVENTION

Figure 1:
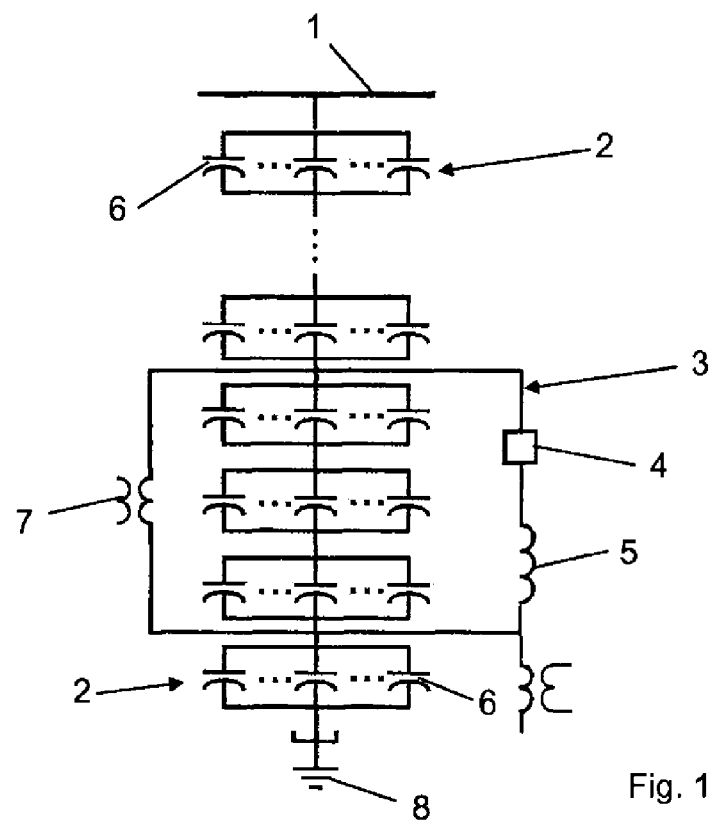
FIG. 1 shows a CAPS arrangement known from the prior art.

FIG. 1 shows an arrangement to improve the system stability of an AC system known from the art, where only one phase of the AC system is shown, which is the busbar 1. Groups 2 of parallel connected capacitors 6 are arranged in a series connection between the busbar 1 and ground 8. This arrangement is known as capacitor bank. There are shown altogether six groups 2 of capacitors 6. Three of these groups 2 are arranged to be short-circuited by a so called CAPS arrangement 3, which comprises a series-connection of a vacuum breaker 4 and a current limiting reactor 5 as well as a magnetic potential transformer 7, which both are connected in parallel with the three groups 2. The vacuum breaker and the current limiting reactor are intended to together perform the switching action, and the magnetic potential transformer is intended to discharge trapped charges. The three groups 2 of capacitors 6 are short-circuited in case of emergency, i.e. when the voltage on the busbar 1 falls considerably and for quite a long time, in order to reduce the reactance of the capacitor bank and thereby increase the reactive power output by 27%.

The arrangement shown in FIG. 2 is an embodiment according to the present invention. The arrangement is connected to a three-phase AC system, which in this example is indicated by a three-phase transmission line with phases 11, 12 and 13. The arrangement contains three phases 14, 15 and 16, each of them being connected on one side to one of the phases 11, 12, and 13 of the AC system and on the other side to an original common neutral point 19, where the connection between the phases of the arrangement and the phases of the AC system may be interrupted via a breaker 29 in each phase of the arrangement. A series connection of several capacitors 17 is part of each phase 14-16 of the arrangement, including intermediate connection points 18 between each pair of capacitors 17. Together, the capacitors 17 form a capacitor bank. The capacitor bank is not grounded. Several groups of so called switchable interconnections are shown in FIG. 2, each group containing two such switchable interconnections, i.e. one less than the number of phases. A first group of switchable interconnections 20 and 21 is arranged between intermediate connection points 18 of that pair of capacitors 17 of each phase 14-16 which is located closest to the original common neutral point 19. A second group of switchable interconnections 22 and 23 is arranged between the intermediate connection points 18 of the neighboring pairs of capacitors, i.e. one capacitor 17 further away from the original common neutral point 19 in each phase 14-16; and a third group of switchable interconnections 24 and 25 is arranged even one more capacitor 17 further away. The second and third and any more groups of switchable interconnections not shown here are also called further groups of switchable interconnections, compared to the first group of switchable interconnections. A control unit 30 is connected via means 34 for transferring control signals and/or operational power to each of the switchable interconnections, where operational power does only need to be transferred if it is not generated locally.

Figures 3, 4:
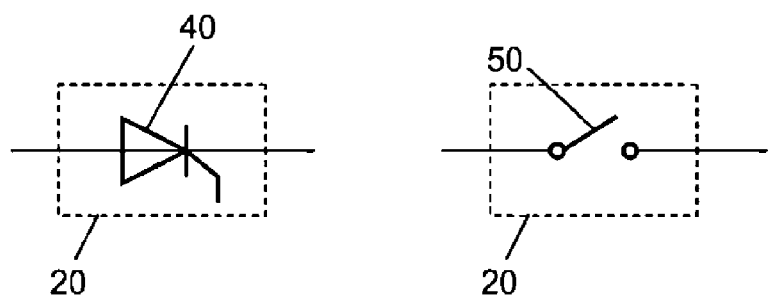
FIG. 3 shows a first embodiment of a switchable interconnection.
FIG. 4 shows a second embodiment of a switchable interconnection.

The switchable interconnections may comprise different switching devices, such as a power electronic switch 40 like a thyristor as indicated in FIG. 3 or a mechanical switch 50 as shown in FIG. 4. In the embodiment of FIG. 2, each switchable interconnection 20-25 comprises a parallel connection of a power electronic switch 40 and a mechanical switch 50, according to FIG. 5.

Opposed to the CAPS arrangement of FIG. 1, the arrangement of FIG. 2 can not only be used to react on an emergency situation with a one-time big step of change of the reactive power output of the capacitor bank. Instead, the arrangement of FIG. 2 can perform a step-wise reactive compensation and control of the three-phase AC system within a control range of about 10-20%. This is achieved by moving the common neutral point of the capacitor bank between the original common neutral point 19 and the AC system in an appropriate way, thereby adjusting the reactance of the capacitor bank to a desired level. The moving of the common neutral point is achieved by consecutively closing the groups of switchable interconnections, starting with the first group, followed by the further groups and opening these groups in the reverse order again.

Figure 8:
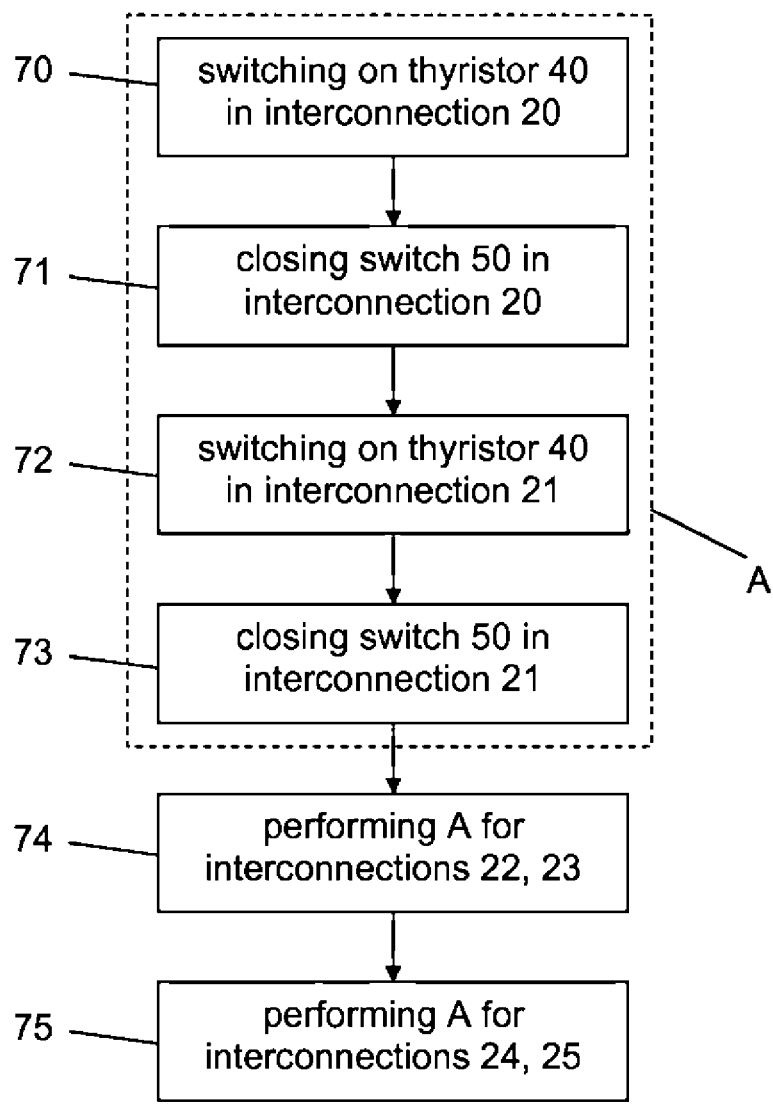
FIG. 8 shows a flow chart of a method to move the common neutral point towards the AC system.
Figure 9:
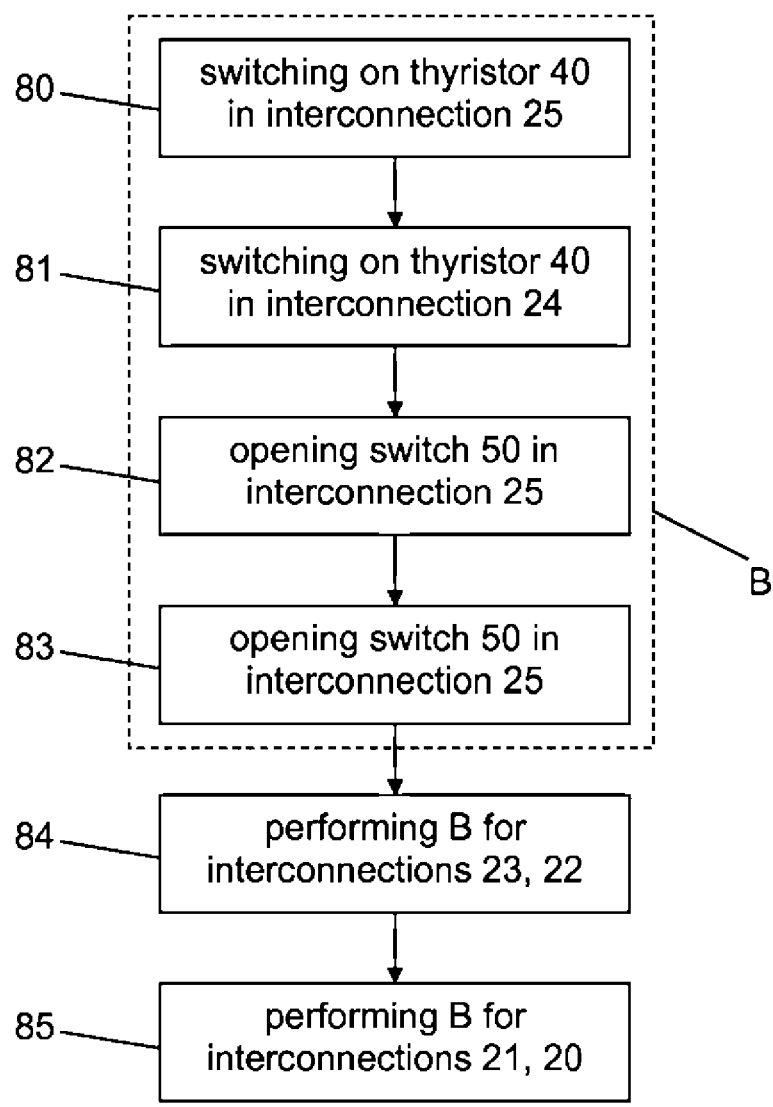
FIG. 9 shows a flow chart of a method to move the common neutral point away from the AC system.

An example for how the common neutral point can be moved all the way up and back again, is depicted in the flow charts in FIGS. 8 and 9. The steps are all initiated and controlled by control unit 30 which sends appropriate control signals to the respective switches and receives information about currents and voltages in the AC system as well as in the capacitor bank via un-shown signal connections. First, in step 70 of FIG. 8, the thyristor 40 of interconnection 20 is switched on thereby closing the interconnection 20. The thyristor 40 is switched on at a point in time when the voltage difference between the phases 14 and 15 is zero, so that transient currents are avoided. Afterwards, in step 71, the mechanical switch 50 is closed so that the current which has been flowing through the parallel connected thyristor 40 is commutated over to the mechanical switch 50. A natural current blocking, i.e. a switching-off, occurs in the thyristor 40 when the current afterwards reverses and crosses zero. In the following steps 72 and 73, the closing or switching of the thyristor 40 at an appropriate point in time followed by the closing of the mechanical switch 50 is performed for switchable interconnection 21. As a result, the first group of switchable interconnections 20 and 21 forms a new common neutral point 26, thereby increasing the reactive power output of the arrangement of FIG. 2 by a first step. The sequence A of steps 70, 71, 72 and 73 is in the following step 74 applied to the second group of switchable interconnections 22 and 23, thereby moving the common neutral point to the new common neutral point 27 and thereby further upwards towards the AC system. The reactive power output of the arrangement is as a result increased by a second step of the same level as the first step, provided that the capacitors 17 have the same size. A third step in the reactive power output is acquired by performing sequence A for the third group of switchable interconnections 24 and 25 (step 75).

The other way round, the common neutral point may be moved backwards from the AC system towards the original common neutral point 19 by opening the switchable interconnections in reverse order. In order to avoid trapped charges in the capacitors 17, the opening should be carried out when the currents through the capacitors 17 are at peak values. According to FIG. 9, first the third group of switchable interconnections 24 and 25 is opened, which is performed in a sequence B containing steps 80-83. In each switchable interconnection 20-25, first the thyristor 40 is switched on to take over the current flowing through the corresponding mechanical switch 50, followed by opening the mechanical switch 50. The thyristor 40 is switched off again when the current reverses and crosses zero. As a result, the reactive power output of the arrangement is reduced by three consecutive steps until it is back to the original power level again.

As described above, the groups of switchable interconnections may be opened and closed in any appropriate order to achieve a reactive compensation and control within the whole range of the three positive and negative power steps, where the number of three is only an example.

Figure 6:
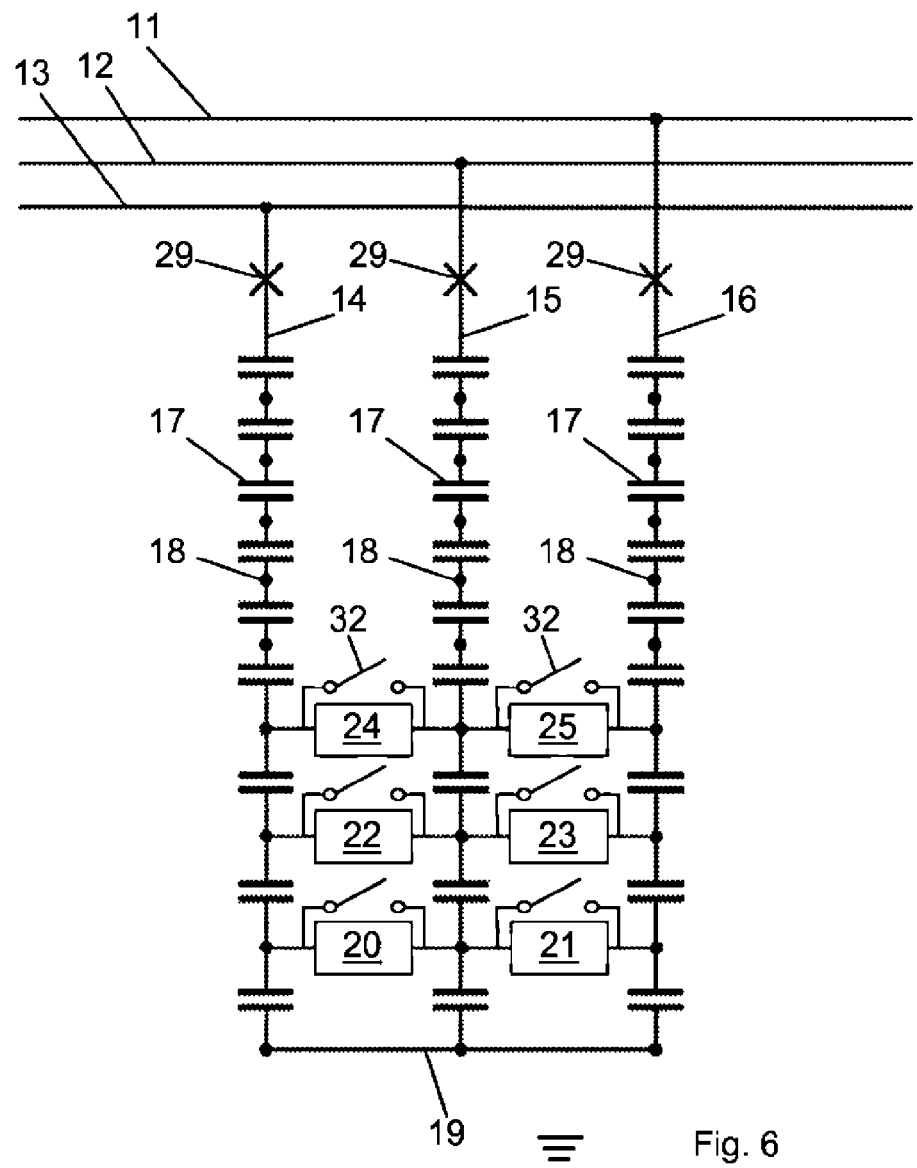
FIG. 6 shows a further development of the embodiment of FIG. 2.

In a further development of the arrangement of FIG. 2, which is shown in FIG. 6, an auxiliary switch 32 is connected in parallel to each switchable interconnection 20-25. This auxiliary switch 32 is opened and closed in an appropriate way in case that unbalances in the currents or voltages between the phases 14-16 of the capacitor bank are detected in order to allow circulating currents to flow which level out the unbalances. These unbalances are mainly due to trapped charges left in the short-circuited capacitors 17 after operation of the switchable interconnections.

Figure 7:
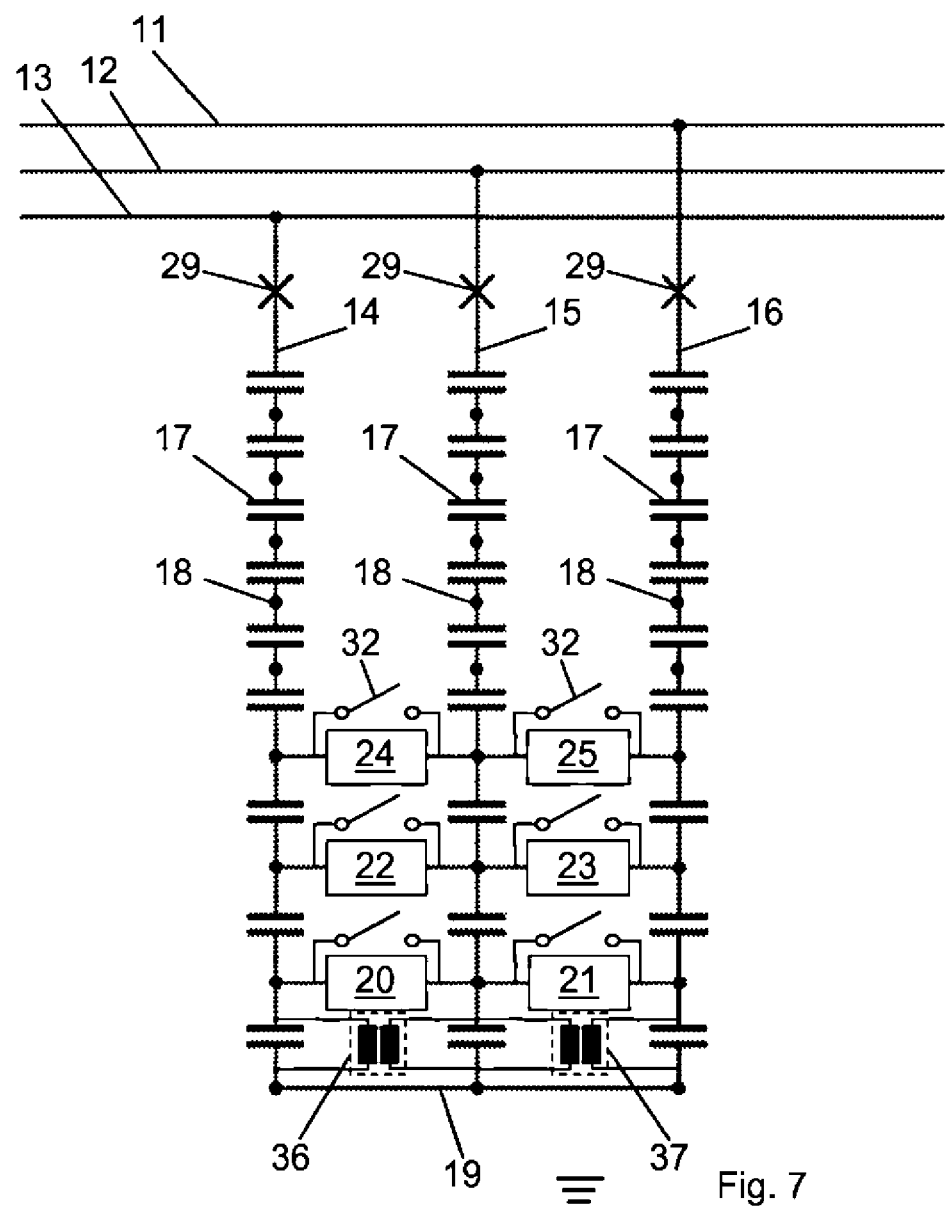
FIG. 7 shows a further development of the embodiment of FIG. 6.

In addition to the auxiliary switch 32 or alternatively as single auxiliary component, an auxiliary transformer 36, 37 may be connected with its primary side in parallel with a capacitor 17 of one of the phases 14, 15 or 16 and with its secondary side in parallel with a capacitor 17 of another one of the phases 14, 15 or 16, as shown in FIG. 7. In this figure, a first auxiliary transformer 36 is connected between a pair of phases 14 and 15 and a second auxiliary transformer 36 is connected between another pair of phases 15 and 16 and on the same level with respect to the distance from the original common neutral point 19 as the first auxiliary transformer 36. In fact, both auxiliary transformers 36 and 37 are placed on the lowest level, with one of their respective terminals in direct electrical contact with the original common neutral point 19.

What is claimed is:

1. A method to control an electrical property of a medium or high voltage AC system via an arrangement, where the AC system and the arrangement each comprise a number n of phases with n being at least two, and where each of the n phases of the arrangement comprises a series connection of at least two electrical elements with an intermediate connection point between each pair of the at least two electrical elements, and
is connected on one side to an original common neutral point and on the other side to one of the n phases of the AC system, characterized in that a number [n−1] of first switchable interconnections are closed, each between two intermediate connection points of two of the n phases of the arrangement, thereby interconnecting all n phases of the arrangement and thereby creating a new common neutral point consisting of the closed first switchable interconnections.

2. The method according to claim 1, where the new common neutral point is moved in a stepwise manner from the original common neutral point towards the AC system by closing a number m of further groups of [n−1] switchable interconnections one by one, with m≥1, where each group m of [n−1] switchable interconnections interconnects all n phases of the arrangement and is connected to intermediate connection points which differ from the intermediate connection points connected to one of the first switchable interconnections or to other groups of switchable interconnections.

3. The method according to claim 2, where the new common neutral point is moved in a stepwise manner from the AC system towards the original common neutral point by opening the m further groups of switchable interconnections one by one followed by opening the first switchable interconnections.

4. The method according to claim 1, where the switchable interconnections are opened or closed, respectively, one after the other in a sequence which follows the positive sequence of an AC current on the AC system with a predetermined time difference in between.

5. The method according to claim 1, where the switchable interconnections each comprise at least one switching device, which is a power electronic switch and/or a mechanical switch, where the switching device is switched on and/or off so that no transient currents or transient voltages occur in the arrangement.

6. The method according to claim 5, where an unbalance in the current or voltage between at least two of the n phases of the arrangement is compensated for by operating an auxiliary switching device which is connected between the at least two of the n phases.

7. An arrangement to control an electrical property of a medium or high voltage AC system comprising a number n of phases with n being at least two, where the arrangement comprises
a number n of phases, each phase comprising a series connection of at least two electrical elements with an intermediate connection point between each pair of the at least two electrical elements, where
each of the n phases of the arrangement is connected on one side to an original common neutral point and on the other side to one of the n phases of the AC system,
characterized in that the arrangement comprises
a number [n−1] of first switchable interconnections, where the first switchable interconnections are each arranged between two intermediate connection points of two of the n phases of the arrangement, and
at least one control unit arranged to control the first switchable interconnections to close, thereby interconnecting all n phases of the arrangement and thereby creating a new common neutral point consisting of the closed first switchable interconnections.

8. The arrangement according to claim 7, which comprises a number m of further groups of [n−1] switchable interconnections, with m≥1, where each further group of switchable interconnections is arranged to interconnect all n phases of the arrangement and is connected to intermediate connection points which differ from the intermediate connection points connected to one of the first switchable interconnections or to other groups of switchable interconnections, and where the at least one control unit is arranged to control the first and the further groups of switchable interconnections.

9. The arrangement according to claim 7, where each switchable interconnection comprises at least one switching device, the at least one switching device being a power electronic switch and/or a mechanical switch.

10. The arrangement according to claim 9, where the mechanical switch is connected in parallel with a power electronic element, the power electronic element being either the power electronic switch or a diode.

11. The arrangement according to claim 7, where the switchable interconnections are floating towards ground.

12. The arrangement according to claim 11, further comprising means for transferring control signals and/or operational power to the switchable interconnections.

13. The arrangement according to claim 7, where at least one auxiliary transformer is connected with its primary side in parallel with an electrical element of a first of the n phases and with its secondary side in parallel with an electrical element of a second of the n phases.

14. The arrangement according to claim 7, where at least one auxiliary switching device is connected between two of the intermediate connection points.

* * * * *